United States Patent

Martelli et al.

[11] 3,986,730
[45] Oct. 19, 1976

[54] PIPE FITTINGS

[76] Inventors: Louis P. Martelli, Villa Jac-Her-Sy, Lotissement la Manet, Hyeres (Var); Michel L. Boisset, 10, rue Branly, Villeurbanne (Rhone), both of France

[22] Filed: Dec. 16, 1974

[21] Appl. No.: 532,832

[30] Foreign Application Priority Data

Dec. 21, 1973  France .............................. 73.47135
Nov. 26, 1974  France .............................. 74.38685

[52] U.S. Cl. ................................. 285/23; 285/110; 285/342; 285/348; 285/353; 285/354
[51] Int. Cl.² ........................................ F16L 55/00
[58] Field of Search ............. 285/23, 342, 348, 110, 285/328, 353, DIG. 22, 354

[56] References Cited
UNITED STATES PATENTS

| | | | |
|---|---|---|---|
| 2,163,810 | 6/1939 | Raybould | 285/348 X |
| 2,478,149 | 8/1949 | Wolfrom et al. | 285/342 |
| 2,497,273 | 2/1950 | Richardon | 285/DIG. 22 |
| 2,561,884 | 7/1951 | Perrow | 285/110 X |
| 3,679,239 | 7/1972 | Schmitt | 285/348 X |
| 3,700,268 | 10/1972 | Nielsen | 285/348 X |

FOREIGN PATENTS OR APPLICATIONS 540,870   11/1941   United Kingdom ................ 285/342

*Primary Examiner*—Dave W. Arola
*Attorney, Agent, or Firm*—Brooks Heidt Haffner & Delahunty

[57] ABSTRACT

The present invention relates to a pipe fitting comprising a cylindrical body, a radially deformable locking piece, a seal and a compression ring which is maintained fast with the body, while being free to slide axially with respect thereto. The ring defines with the body an annular space in which the seal and the locking piece are maintained fixed so that the fitting forms a unit.

8 Claims, 5 Drawing Figures

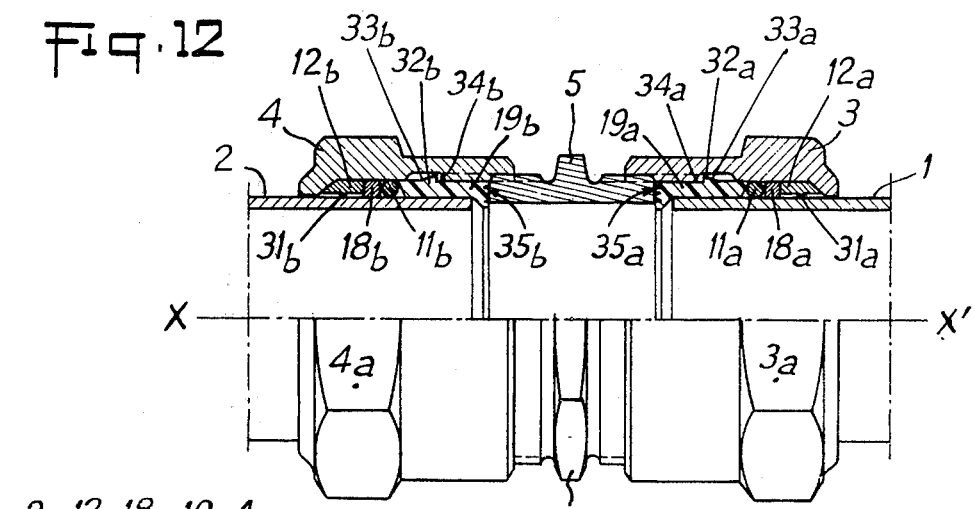
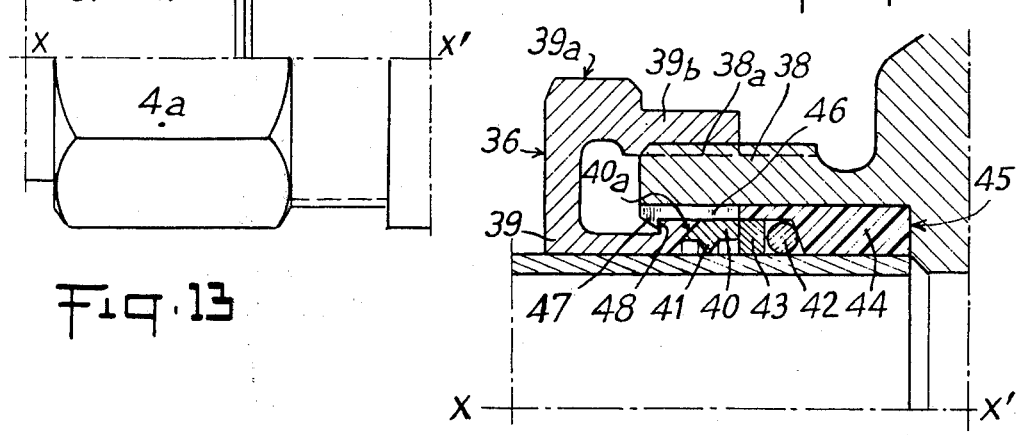
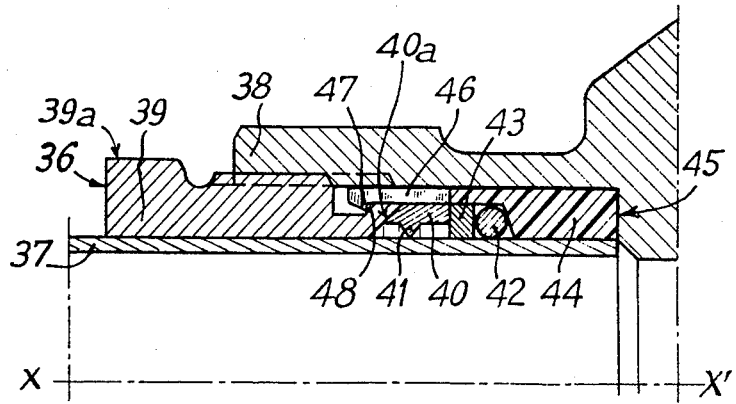

PIPE FITTINGS

The present invention relates to fitting for connecting the end of a smooth pipe to another pipe or the outlet of a fluid-conveying-pipe element, such as a faucet, valve, branch Tee or reducer, etc.

A fitting according to the invention is of the so-called compression type. It comprises a radially deformable locking piece which automatically anchors on the end of a smooth pipe under the effect of an axial compression due to the fitting being tightened.

Numerous models of compression fittings are already known which comprise a cylindrical body, a seal, a radially deformable locking piece, for example a split ring, and a compression ring which slides axially when the fitting is assembled, causing the seal to be crushed and the locking piece to be anchored on the end of the pipe.

In these known types of fittings, the compression ring is fast with the union serving to assemble two pipes end to end.

This results in special unions having to be used and these fittings cannot be connected to the standard end of a fluid-conveying-pipe element.

On the other hand, the accessories of the fitting, i.e. the seal, the locking piece and possibly the intermediate ring between said latter are not fixed in the fitting and must be placed carefully therein in the desired order and direction for each connection.

One object of the present invention is to provide a dismountable pipe fitting, of the type with compression ring, which can be connected equally well to the standard end of a fluid-conveying-pipe element and to a conventional union.

Another object of the present invention is to provide a pipe fitting, of the type with compression ring, which forms with its accessories a ready-to-use unit.

These objects are achieved by means of a fitting comprising a compression ring rendered fast with the body of the fitting whilst being able to slide axially with respect thereto over a sufficient length to compress the seal and the locking piece, which compression ring defines with said body, after having been securely connected thereto, an annular space in which the seal and the locking piece are maintained fixed so that the fitting equipped with its accessories forms a ready-to-use unit.

In one embodiment of a fitting according to the invention, the cylindrical body of the fitting comprises an inner peripheral groove and the compression ring is disposed inside said body and comprises, on the outer periphery, at least one projection whose width is smaller than that of said groove, said projection being engaged in said groove and may slide inside said latter, thus maintaining the compression ring fast with the body of the fitting whilst enabling it to slide axially.

In another embodiment, a fitting according to the invention comprises at its outer end a female thread which extends up to a peripheral groove and the compression ring comprises a threaded flange whose width is smaller than that of said groove, which flange is housed in said groove after having been screwed in said thread.

In another embodiment, the compression ring comprises a peripheral channel in which is disposed a ring whose width is smaller than that of said groove, said ring being housed in said groove to maintain the compression ring fixed in the body of the fitting.

In another embodiment, the compression ring, placed inside the body of the fitting, is made of rigid plastics material and comprises at least one catch, of triangular section, slightly projecting with respect to its outer surface, said catch or catches being forcibly engaged behind a circular shoulder located on the inner periphery of the cylindrical body of the fitting. In this embodiment, the outer terminal face of the compression ring comprises circular ribs and acts as seal between the fitting and the element on which it is connected.

A fitting according to the invention is usually designed to assemble the end of a pipe with another pipe or with a fluid-conveying-pipe element of the same inner diameter, having standard outer dimensions.

However, a fitting according to the invention may also be designed to assemble the end of a pipe to a fluid-conveying-pipe element of which the diameter is greater than the standard ones, e.g. on the outlet of a valve "connected under pressure", i.e. a valve which is placed on a pipe without said pipe first being emptied of the fluid circulating therein. In this case, a fitting according to the invention comprises a compression ring, located in line with the cylindrical body of the fitting, comprising inwardly facing hooks, which form a clamp hooked to a peripheral shoulder of the body of the fitting, said ring defining therewith an annular space in which said seal and said locking piece are maintained fixed.

The result of the invention is a new fitting with compression ring which automatically anchors on the smooth end of a pipe in the course of connection. With regard to the hitherto known fittings of this type, it has the advantage of being delivered in the form of a ready-to-use unit, forming an entity with its accessories, without there being any risk as losing said accessories or their being placed in a direction or order which would result in poor functioning of the fitting.

The embodiments described render the compression ring integral with the fitting but easily dismountable, so that it may be disconnected without the aid of any tool, whenever one of the accessories has to be replaced. By using compression rings made of rigid plastics material, they may act as seal between the connection and the element on which it is connected, this constituting a supplementary advantage.

The compression rings made of plastics material also have the advantage, thanks to their elasticity, of allowing economical forms of producing catches which are forcibly engaged behind a shoulder or in a peripheral groove and which maintain the compression ring integral with the body but easy to remove by forcing.

Another advantage of the fittings according to the invention, which are threaded or flanged, resides in their enabling the end of a pipe to be connected to another pipe or to a standard terminal of a tap element without requiring any special connecting piece.

The invention will be more readily understood on reading the following description with reference to the accompanying drawings, in which:

FIGS. 12 and 13 are longitudinal half-sectional views of fittings according to the invention.

FIGS. 14 and 15 are longitudinal half-sections of fittings according to the invention connected to a valve "connected under pressure".

Figure 1:
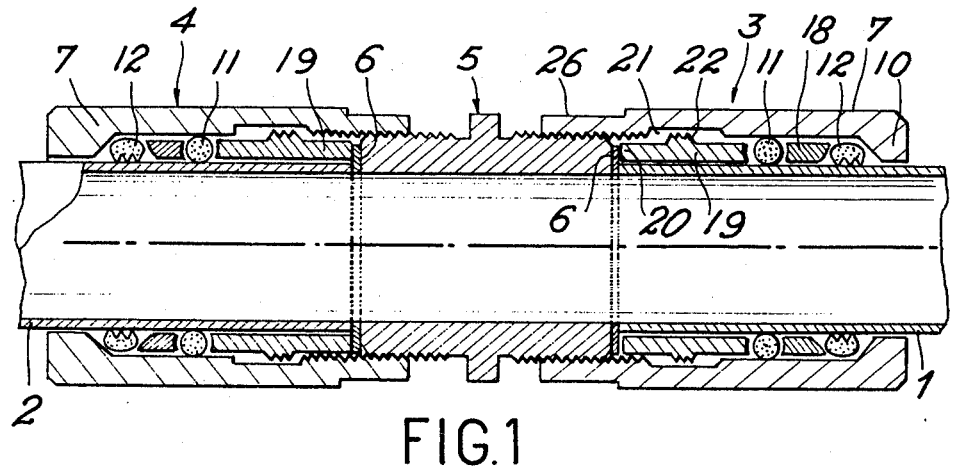
FIG. 1 is a longitudinal section through an end-to-end assembly of two pipes.

Referring now to the drawings, FIG. 1 shows the ends of two pipes 1 and 2 assembled together by means of two identical threaded fittings 3 and 4, screwed to an intermediate threaded union 5 with the interposition of optional seals 6.

Figure 7:
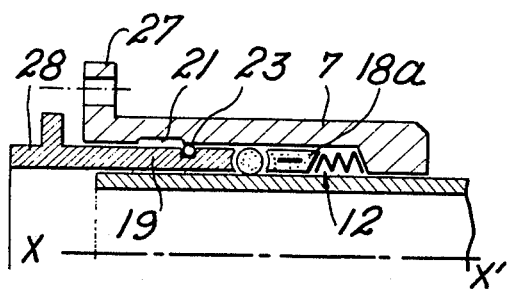

Each of the fittings 3 and 4 is composed of a monobloc cylindrical body 7, in the form of a muff, enveloping the end of the pipe. This body is provided with a dismountable assembly means, for example a threading 8, which may be replaced by any other known assembling means, e.g. a flange as illustrated in FIG. 7.

With pipe 1, the body 7 defines an annular space 9 which is closed at the inner end, facing the thread 8, by a shoulder 10 whose inner diameter is slightly larger than the outer diameter of pipe 1. This shoulder is conical in the case of FIGS. 1 and 2 and constitutes a stop.

In the annular space 9 is housed a seal 11, e.g. an O-ring, which ensures the seal between the body of the fitting and the pipe.

Figure 4:
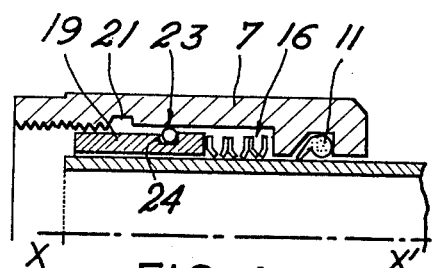
Figure 8:
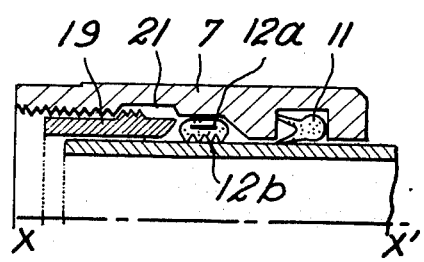

This seal may for example be an O-ring, a double torus or any other form of seal with single or double lip as shown for example in FIGS. 4 and 8. The seal 11 may be housed in space 9 or in a separate channel as shown in FIGS. 4 and 8.

In the annular space 9 is housed a piece 12 which is radially deformable under the effect of an axial compression, i.e. a compression exerted in the direction of axis $xx'$ of the fitting and the pipe. This piece ensures that the fitting is locked to the pipe and enables the fitting to withstand pulling or compression forces.

Figure 3:
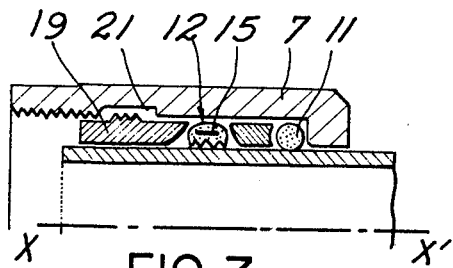

This locking piece may take very varied shapes. It may for example be a split or solid ring, whose transverse section may be trapezoidal (FIG. 3), semi-circular (FIG. 1), rectangular with lateral ramps (FIG. 8), triangular, in zig-zag form (FIG. 7). This locking piece may also be constituted of a plurality of juxtaposed elements, for example a plurality of elastic cup-shaped discs 16 in reversed arrangement (FIG. 4), of fan-shaped discs 17 (FIG. 5) or truncated discs in reversed arrangement.

Figure 2:
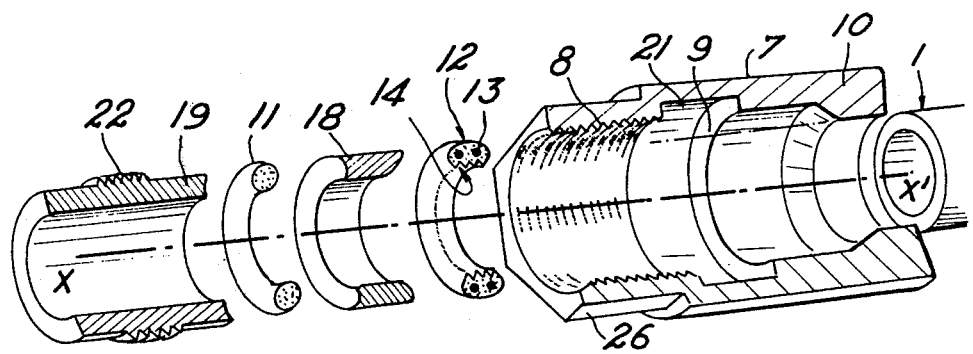
FIG. 2 is an exploded view in perspective of half the fitting of FIG. 1.

The locking piece may be metallic, plastics or made of an elastomer material comprising reinforcements 13 (FIG. 2).

In order to improve the connection between the locking piece and the pipe, the inner face of the locking piece may include concentric ribs 14 which may be straight or inclined.

An intermediate ring 18 is placed between the seal and locking piece to transmit the axial thrust of one to the other. FIG. 1 shows an intermediate ring of which the side placed in contact with the O-ring 11 takes the form of this seal and the other side of which forms a conical ramp which cooperates with the semi-circular section of the locking piece 12. This intermediate ring may take different forms according to the relative positions and shapes of the seal 11 and the locking piece 12. This intermediate ring is not indispensable and may be omitted.

The fitting is locked to the pipe and possibly the seal is compressed automatically under the effect of the assembling. To this end, a fitting according to the invention comprises, in the annular space 9, a piece 19 that may move in translation. This piece is constituted by a ring or socket which may slide freely in the intermediate space 9, within certain limits.

The compression piece 19 is maintained integral with the body 7 whilst being able to slide axially with respect thereto. For example, the body 7 comprises, on its inner periphery, a groove 21 and the ring 19 comprises, on its outer periphery, a threaded flange 22. To put the ring 19 into place, the thread 22 is screwed into the female thread of the body 7 until the flange 22 is housed in the groove 21. The groove 21 is wider than the flange 22 so that the piece 19 may move in translation within certain limits.

Figure 5:
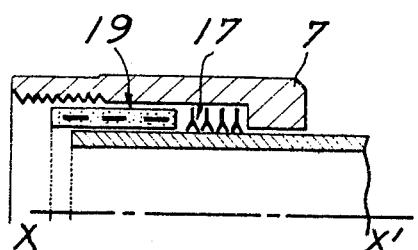
Figure 6:
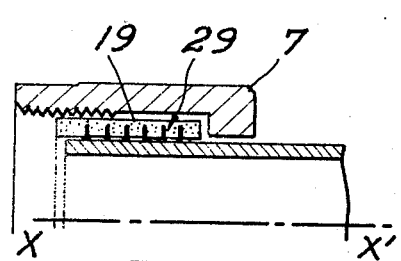

Other equivalent devices may be used to maintain the compression ring 19 integral with the body 7. FIGS. 4 and 7 show for example a ring 19 which is held fixed by a circlips or split ring 23 placed in a channel 24. In certain embodiments, such as that of FIG. 9, the socket 19 is made of an elastomer material and comprises a boss 25 which penetrates into the groove 21 and maintains the ring fixed. FIGS. 5 and 6 show an embodiment in which the socket 19 is made of an elastomer material reinforced by a reinforcement and is maintained in the body by friction.

FIG. 7 illustrates an example of a fitting with fixation by flange 27. In this case, a piece 28 is disposed between the two flanges of the two fittings and this piece serves as a stop for the compression rings 19. In this embodiment, the intermediate piece 18 is a ring made of an elastomeric material comprising a steel reinforcement 18a. The locking piece 12 is constituted by a steel ring folded in zig-zag.

FIG. 5 shows an embodiment in which the compression ring 19 is made of a reinforced elastomeric material and fulfills both the functions of seal between the fitting and the pipe and of compression piece of the locking device which is constituted for example of fanned discs 17.

Figure 9:
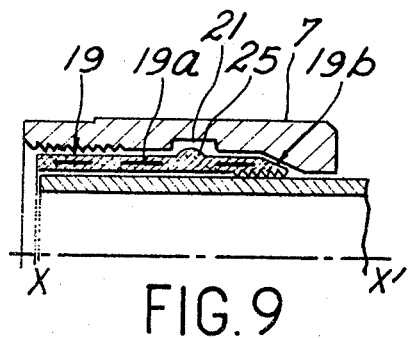

FIG. 9 shows a more simple embodiment in which the ring 19 is also made of an elastomeric material reinforced by reinforcements 19a and extends over the whole length of the annular space. It comprises a swelling 25 which is housed in a channel 21 of the body and which acts as seal and maintains the socket fixed. It comprises, on the side opposite the thread, a truncated extension 19b of which the inner surfaces comprises ribs and which is crushed against the shoulder of the body 7 forming a bevel. In this embodiment, the piece 19 fulfills the functions of locking piece, seal and compression piece.

FIG. 6 shows an embodiment in which the ring 19 also fulfills all these functions. In this example, the ring 19 is made of an elastomeric material and it is maintained by friction inside the fitting body 7. It comprises reinforcements 29 such as cup shaped discs in reversed arrangement, of which the inner edge projects. The compression of the socket 19, when the fitting is assembled, causes these projections to penetrate in the pipe and the fitting is locked.

Figure 10:
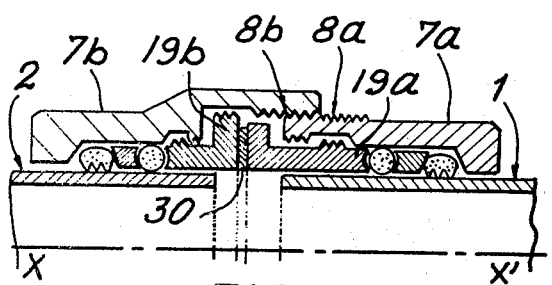

FIG. 10 shows a half-section of two pipes 1 and 2 assembled end to end by a fitting formed of two terminals 7a and 7b.

The body of the terminal 7a comprises a male thread 8a on which the female thread 8b of the terminal 7b screws. The two compression rings 19a and 19b come into contact with each other whilst terminal 7b is screwing on terminal 7a. A seal 30 is interposed between the two rings 19a and 19b of which the ends opposite comprise an enlargement which serves as abutment face for the seal 30.

Figure 11:
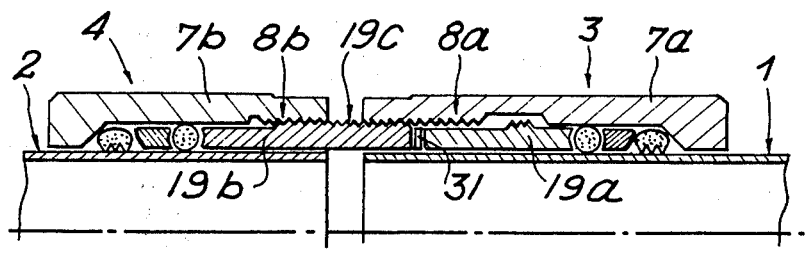
FIGS. 3 to 11 are schematic longitudinal half-sections of fittings according to the invention.

FIG. 11 shows in half-section two pipes 1 and 2 assembled end to end by a fitting formed of two terminals 2 and 4. The bodies 7a and 7b of the two terminals are identical to those of the previously described fittings. The only difference resides in that one of the two compression rings, for example ring 19b, is longer than the other and is provided on its outer periphery with a male thread 19c on which are screwed the female threads 8a and 8b. A seal 31 is interposed between pieces 19a and 19b.

FIG. 12 is a longitudinal half-sectional view of two pipes 1 and 2 connected together by means of two half-fittings 3 and 4 according to the invention. The parts homologous to those of the fitting of FIG. 1 are designated by the same reference numerals.

The locking pieces 12a, 12b with which these fittings are equipped are split rings having a conical lateral face which abuts on a conical surface of the body of the fitting and cooperates with said surface to produce the radial deformation of the ring.

The rings 12a, 12b comprise, on their inner face, a projecting rib 31a, 31b of triangular section.

The distance between the two edges of the slit of the ring is such that these two edges abut when a sufficient tightening of the pipe is achieved. This arrangement avoids a permanent deformation of the ring and an excess of tightening of the pipe which would risk deteriorating it.

The compression rings 19a, 19b are made of a plastics material which is sufficiently rigid to transmit the axial thrusts.

They comprise on their outer periphery one or more catches 32a, 32b of triangular section, slightly projecting. These stops are forcibly engaged behind a circular shoulder 34a, 34b located on the inner periphery of the body of the corresponding fitting so that each of the rings 19a, 19b is maintained integral with a half-fitting 3 or 4 whilst being free to slide axially with respect thereto over a sufficient length to provoke the compression of the seals 11a, 11b and the locking pieces 12a, 12b.

The outer terminal face of each of the rings 19a, 19b which abuts against the ends of the boss 5 comprises circular ridges 35a, 35b and acts as seal between the fitting and the boss.

FIG. 13 shows a fitting of the same type as that shown previously, mounted on the end of a smooth pipe 2 to connect said latter to the threaded terminal 38 of a standard valve. This fitting differs from the preceding one by the direction of the locking piece 12 which is turned through 180° and the conical lateral face of which abuts against the likewise conical lateral face of an intermediate ring 18.

FIGS. 14 and 15 show a fitting 36 for assembling the end of a pipe 37 onto an orifice of larger diameter, for example to the threaded end 38 of a valve "connected under pressure". Such a valve is branched to a pipe conveying fluid under pressure which is then pierced by a drill engaged through the valve. These valves comprise an outlet terminal 38 whose diameter is greater than that of conventional ends and than that of the pipe 37.

The fitting 36 comprises a cylindrical body 39 provided externally with a nut 39a.

In the case of FIG. 14, the body 39 is externally threaded and is screwed into a female thread of the terminal 38.

In the case of FIG. 15, the terminal 38 comprises an outer male thread 40 and the body of the fitting comprises an extension 39b comprising a femeale thread which is screwed onto the thread 40.

In both cases, the fitting comprises a locking piece 40 identical to the piece 12a or 12b of FIG. 12, as well as a seal 42 and an intermediate ring 43.

It comprises a compression ring 44 made of a rigid plastics material which abuts against a shoulder 45 of the body of the valve when the fitting is being tightened.

This ring is located in the extension of the body of the fitting 39. It comprises fingers 46 provided with an inwardly turned hook 47. These fingers form a clamp which is engaged behind a peripheral shoulder 48 of the body of the fitting and which maintains the ring fast with this latter whilst enabling it to slide axially towards the left of the Figure. The ring 44 defines with the inner end of the fitting body an annular space in which are housed and maintained fixed the locking piece 40, the intermediate ring 43 and the seal 42, so that the connection provided with its compression ring and its accessories forms a ready-to-use unit.

What we claim is:

1. A pipe fitting for securing a pipe having a smooth end to another part, said fitting comprising a hollow cylindrical body with an axially extending bore, said body having an axially forward end and an axially opposite rearward end and having means thereon at said forward end for securing it to said other part including means for forcing said body in the axial direction toward said other part, and a sealing member and a locking member within said bore, each said sealing member and said locking member having a central opening substantially equal in size to the outer size of said pipe for receiving and engaging said smooth end of said pipe, said sealing member being compressible and intermediate said forward and rearward ends for sealing said body to said pipe, said locking member being radially deformable by axial pressure thereon for locking said body on said pipe and being intermediate said forward and rearward ends, said body having an inwardly extending portion at the rearward end thereof engageable with one of said locking member and said sealing member for preventing rearward axial movement of said one member, said inwardly extending portion having a central opening therein substantially equal in size to the size of the central opening in said locking member but larger than the outer size of said pipe to permit said pipe to pass through said central opening in said inwardly extending portion, and a compression member having a through-bore at least equal in size to said outer size of said pipe slidably mounted in said bore adjacent said forward end and intermediate said locking and sealing members and said forward end for engagement with said other part upon securing said pipe to said other part thereby to cause said compression member to move axially rearwardly of said body as said body is forced toward said other part, said compression member axially compressing said sealing and locking members as said compression member moves axially rearwardly and the wall of said bore and said compression member having cooperating and interengaging means permitting said compression member to slide axially by an amount sufficient to compress said sealing and locking members but limiting forward axial movement of said compression member to within said bore.

2. A pipe fitting as claimed in claim 1, wherein said sealing member is a peripherally continuous sealing ring, said locking member is a locking ring, said compression member is a compression ring and said sealing ring is intermediate said compression ring and said locking ring.

3. A pipe fitting as claimed in claim 2 further comprising a further ring intermediate said sealing ring and said locking ring and engageable with both said sealing ring and said locking ring.

4. A pipe fitting as claimed in claim 1, wherein said co-operating means comprises a projection on the periphery of said compression member and said body has an inner, peripherally extending groove in the wall of said bore in which said projection is received, the axial length of said groove being greater than the axial length of said projection.

5. A pipe fitting as claimed in claim 4, wherein said projection is a ring mounted on said compression member, said compression member having a peripheral groove in which said last-mentioned ring is received.

6. A pipe fitting as claimed in claim 1, wherein said co-operating means comprises an inwardly extending shoulder on the interior of said body at said forward end thereof and a projection of triangular cross-section on the periphery of said compression member, the diameter of said projection being greater than the inner diameter of said shoulder and the diameter of said bore being at least equal to the diameter of said projection for an axial distance from said shoulder toward said rearward end which is greater than the axial length of said projection, said compression member including said projection being made of a plastics material having a compressibility permitting the insertion of said compression member into said bore from said forward end of said body.

7. A pipe fitting as claimed in claim 1, wherein said compression member is made of a plastics material and has an outer size greater than the inner size of the portion of said bore adjacent thereto whereby said compression member is maintained within said bore by frictional engagement of the periphery of said compression member with the wall of said bore.

8. A fitting as claimed in claim 1 for assembling the end of a pipe to a fluid-conveying pipe element of larger diameter in which said compression ring, which is located in line with said cylindrical body, comprises inwardly facing hooks forming a clamp and after said clamp has been hooked to a peripheral shoulder of said cylindrical body, said ring is integral with said body and it defines with said latter an annular space in which said seal and said locking piece are maintained fixed.

* * * * *